Patented Dec. 20, 1927.

1,653,272

UNITED STATES PATENT OFFICE.

WALTER H. GREEN AND ABRAHAM S. BEHRMAN, OF CHICAGO, ILLINOIS, ASSIGNORS, BY MESNE ASSIGNMENTS, TO GENERAL ZEOLITE COMPANY, OF CHICAGO, ILLINOIS, A CORPORATION OF ILLINOIS.

PROCESS OF PURIFYING WATER.

No Drawing.     Application filed December 9, 1921. Serial No. 521,213.

This invention relates to the art of water purification, and is particularly concerned with an improvement in the method of softening water by precipitating from solution therein certain undesirable or hardening elements or compounds. In what is ordinarily termed the precipitation process of softening water, the elements which cause the hardness are removed from the water by the addition of certain reagents, such as lime or soda or both, which combine with the undesirable substances in solution, forming insoluble compounds which are then separated from the water by sedimentation or filtration.

In general, the majority of natural hard waters, when treated with lime and soda in the usual manner, yield a sediment or sludge composed principally of varying amounts of calcium carbonate and magnesium hydroxide accompanied by smaller amounts of various other substances.

We have found that in the precipitation process above described, the chemical reactions involved are materially assisted, under certain conditions, by the reintroduction of sludge composed of the insoluble compounds and its employment in conjunction with the treating chemicals.

The formulation of a workable and practical method embracing the use of previously formed sludge and bringing about the conditions under which such sludge may be successfully employed, constitutes the present invention.

The principal purpose of the invention may be said to be the provision of an improved and uniformly successful method of softening water by the precipitation process whereby the chemical reactions involved are carried through to a greater degree of completion than heretofore, thus producing a practically completely softened water.

Another substantial and beneficial result following the use of our improved process is a material reduction in the time required for the production of soft water by the precipitation process.

A still further advantage is realized, namely, the production and delivery of an evenly treated water, it having been demonstrated that variations in the constituency of the raw water, or in the supply of chemicals, are not reflected in the treated water, which as drawn off will show uniform results in the test for hardness.

Otherwise stated, it is possible, by the employment of our invention, to carry through more completely the chemical reactions involved in removing from solution the hardening elements in water; to hasten the reactions; to cause the formed suspended particles of insoluble matter to collect into comparatively large and heavy aggregates; to expedite the precipitation; to stabilize the treatment, and, finally, to soften water much more completely, uniformly and quickly than has hitherto been possible, by the lime and soda, or precipitation process.

While the foregoing statements are indicative of the general nature, purpose, and results of the invention, other advantages to be derived therefrom, although not expressly referred to, will be obvious upon a full understanding of the invention as herein described and claimed.

We have found that for successful results, it is necessary to maintain a state of hydrate alkalinity in the water undergoing treatment, at least, no bi-carbonate alkalinity is to be permitted, wherefore it is necessary that sufficient lime be added to combine with all of the free, and with what is commonly called the half-bound, carbon dioxide, in which condition the water will react alkaline to the phenolphthalein. It is also requisite that there be added or formed during the treatment aluminum hydroxide, iron hydroxide, or the like. In those waters having a large percentage of iron or aluminum naturally present, the added lime precipitates the iron or aluminum in hydrate form, rendering the addition unnecessary.

For an example of the application of the invention we cite a treatment of Lake Michigan water, which has about 8 grains hardness per gallon. To each gallon of raw water we add approximately 7 to 8½ grains of calcium hydrate, 1 to 3 grains of sodium carbonate, 1 to 3 grains of aluminum sulphate or its equivalent, and about ¼ of a gallon of sludge. On this basis we have been able to reduce the hardness of Lake Michigan water to less than one grain per gallon, calcium carbonate equivalent, within a combined reaction and settling period of only 11 minutes.

In the lime-soda water softening process, as typically carried out, the hardness caused by the calcium and magnesium bicarbonates—frequently called "temporary" hardness—is removed with lime. The chemical reactions taking place may be written thus:

$$Ca(HCO_3)_2 + Ca(OH)_2 \rightarrow 2CaCO_3 + 2H_2O.$$

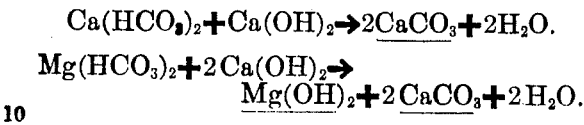

It will be noted that the calcium is precipitated as calcium carbonate, and the magnesium as magnesium hydrate.

In the removal of non-carbonate hardness, frequently referred to as "permanent hardness", the calcium and magnesium are likewise precipitated as the carbonate and hydrate respectively. To effect this precipitation, soda ash is used in the case of calcium compounds, and soda ash and lime in the case of magnesium compounds, as magnesium carbonate is fairly soluble in water and is therefore converted to the insoluble hydrate by the use of lime.

The chemical reactions occurring in the removal of non-carbonate hardness may be exemplified in the treatment of calcium and magnesium sulphates as follows:

$$CaSO_4 + Na_2CO_3 \rightarrow CaCO_3 + Na_2SO_4.$$

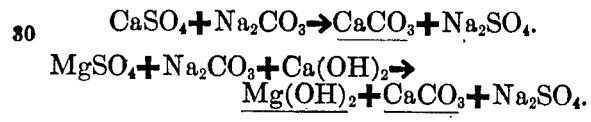

Most natural hard waters contain, in addition to calcium and magnesium compounds, a greater or less quantity of free carbon dioxide. In the lime-soda softening process, the free carbon dioxide is removed in the form of the insoluble calcium carbonate by the lime treatment thus:

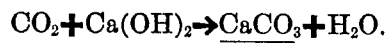

In actual practice it is customary to add a slight excess of the reagent or reagents employed, partly to assure the presence of sufficient chemicals for the reactions and partly because of the beneficial effect of the excess in facilitating the carrying out of the reactions both in respect to the speed and completeness of the reactions.

It will thus be seen, when hard water is softened by the lime-soda process, that, as soon as the water and chemical are thoroughly mixed, the solution may be regarded, potentially at least, as a supersaturated solution of calcium carbonate and magnesium hydrate. The four-hour retention period commonly allowed in cold process softening may thus be considered as providing opportunity for the change from the unstable condition of supersaturation to the stable condition of saturation and for the coalescence of the minute particles of calcium carbonate and magnesium hydrate into aggregates sufficiently large and heavy to be removed by sedimentation or filtration, or both.

Even at the end of such four hour period—or considerably longer—the water generally has not reached a condition of final stabilization—that is, the amount of calcium carbonate, for example, is somewhat greater than the theoretical solubility. As a consequence, if such water is exposed to some influence, such as very long periods of time, or to heat, which will destroy the equilibrium, the calcium carbonate in excess of the theoretical solubility will be deposited as an "after-precipitate". This after-precipitation from cold process softened waters may result in serious consequences such as obstruction of pipe lines, water meters and the like.

The softening process may therefore be considered as the progressive displacement of equilibria in the process of development from the unstable condition of supersaturation to the relatively stable condition of saturation. This development may be accelerated by adding to the mixture of raw water and chemical an insoluble material which will present a relatively large surface area for contact with the newly forming insoluble compounds.

The accelerating effect of surface is utilized to great advantage in the present invention. The sludge which is added to the mixture of water and chemical is composed of finely divided particles and presents great surface area per unit of volume.

The introduction of the sludge presents a large number of nuclei to which the newly forming insoluble compounds are attracted and adhere, thus expediting the sedimentation. The effect of the sludge in accelerating the deposition of the precipitate is aided by the fact that the precipitate in process of formation is essentially the same in chemical composition as the added sludge. The sludge also acts as in the nature of a chemical reservoir, in that it takes up from the water such unused chemicals as may be present, due to temporary over-treatment, and holds the same until such time as a period of under-treatment occurs, when the stored active chemicals will release themselves, react with the hardening elements in the water and thus remedy the deficiency in added chemical. For a short period under the previously stated conditions, the reintroduction of sludge alone, without any addition of treating chemicals, will suffice to carry on and complete the reactions.

As a result of the sludge treatment the products of the water softening reactions, e. g. calcium carbonate and magnesium hydrate, are removed and the stable condition of saturation reached in but a fraction of the time required by prior practice, with results and economies not heretofore attainable, particularly by cold lime and soda treatment. Another and very important result is the elimination of "after precipitation".

By the addition of aluminum sulphate to an alkaline water, a gelatinous precipitate of aluminum hydrate is formed, either directly or by hydrolysis of an intermediate product. In the lime-soda process the formation of aluminum hydrate by reaction of aluminum sulphate on lime may be shown thus:

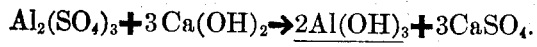
$$Al_2(SO_4)_3 + 3\,Ca(OH)_2 \rightarrow 2Al(OH)_3 + 3CaSO_4.$$

Aluminum sulphate and the alums are employed in water purification because of the ability of the gelatinous aluminum hydrate to collect minute particles into larger aggregates. In the present invention this property is employed, partly for its effect on the calcium carbonate and magnesium hydrate to be precipitated, but principally for its effect on the sludge, which it maintains in suitable condition, and keeps from disintegration notwithstanding its continuous cycle of use.

While the provision of apparatus in which to carry out the process is not a part of this invention, we refer to the device of our joint application for patent, Serial No. 414,293, as one which may in our opinion be most advantageously used for this purpose. It is to be understood that the treatment herein prescribed contemplates what might be termed a continuous process, in which the water to be treated flows continuously into and through the treatment apparatus and the reagents and sludge are introduced to the incoming hard water continuously and with due regard to proper proportioning between the amount of chemicals added and the degree of hardness and the amount of water entering the treatment apparatus.

We claim:—

1. The process of purifying water, comprising precipitation of the hardening constituents therein by the addition of lime, of previously precipitated sludge and aluminum sulphate.

2. The process of purifying water, comprising precipitation of the hardening constituents therein by the addition of lime and soda, of previously precipitated sludge and aluminum sulphate.

3. The process of purifying water which comprises precipitating the hardening constituents therein by the addition of lime, a coagulant, and previously precipitated sludge, the addition of lime to be in sufficient quantity to render the water alkaline to phenolphthalein.

4. The process of purifying water which comprises precipitation of the hardening constituents therein by the addition of lime, a coagulant and previously precipitated sludge.

5. The process of purifying water which comprises precipitation of the hardening constituents therein by the addition of lime, a coagulant and previously precipitated sludge, the addition of lime to be in such proportion as to establish a state of hydrate alkalinity in the water.

6. The process of softening water which comprises precipitation of the hardening constituents therein by the addition of lime and of a finely divided insoluble substance capable of accelerating coalescence of the precipitate.

7. The process of softening water which comprises adding to a flowing stream of hard water, successive quantities of lime, a coagulant, and sludge resulting from previous like treatment, and then retarding the flow to permit sedimentation of the precipitate caused by the additions.

8. The lime soda process of softening water modified by the addition of previously precipitated sludge.

9. The process of softening water which comprises adding to a flowing stream of hard water, lime, a coagulant and sludge resulting from previous like treatment, the sludge to be added in the approximate ratio of one part by volume to four parts of the water to be treated.

In testimony whereof we have hereunto subscribed our names.

WALTER H. GREEN.
ABRAHAM S. BEHRMAN.